United States Patent
Brailovskiy et al.

(10) Patent No.: US 9,438,918 B2
(45) Date of Patent: Sep. 6, 2016

(54) FRAME LEVEL RATE CONTROL USING MOTION ESTIMATED DISTORTIONS

(71) Applicant: Intel Corporation, Santa Clara, CA (US)

(72) Inventors: Ilya V. Brailovskiy, Palo Alto, CA (US); Jason D. Tanner, Folsom, CA (US); James M. Holland, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 533 days.

(21) Appl. No.: 13/624,139

(22) Filed: Sep. 21, 2012

(65) Prior Publication Data
US 2013/0279567 A1    Oct. 24, 2013

Related U.S. Application Data

(60) Provisional application No. 61/637,021, filed on Apr. 23, 2012.

(51) Int. Cl.
| | |
|---|---|
| H04N 11/02 | (2006.01) |
| H04N 19/154 | (2014.01) |
| H04N 19/172 | (2014.01) |
| H04N 19/124 | (2014.01) |
| H04N 19/137 | (2014.01) |
| H04N 19/142 | (2014.01) |

(52) U.S. Cl.
CPC ........... *H04N 19/154* (2014.11); *H04N 19/124* (2014.11); *H04N 19/137* (2014.11); *H04N 19/142* (2014.11); *H04N 19/172* (2014.11)

(58) Field of Classification Search
USPC ........................................ 375/240.01–240.29
See application file for complete search history.

(56) References Cited

U.S. PATENT DOCUMENTS

| | | | |
|---|---|---|---|
| 5,617,150 A * | 4/1997 | Nam et al. ................. 348/700 |
| 8,311,097 B2 * | 11/2012 | Ma ........................... 375/240.02 |
| 2004/0032422 A1 * | 2/2004 | Fisher et al. ................ 345/716 |
| 2004/0037357 A1 * | 2/2004 | Bagni et al. ............. 375/240.15 |
| 2006/0104360 A1 * | 5/2006 | Gordon .................. 375/240.16 |
| 2006/0222078 A1 * | 10/2006 | Raveendran ............. 375/240.16 |
| 2006/0245493 A1 * | 11/2006 | Wang ....................... 375/240.03 |
| 2007/0177667 A1 | 8/2007 | Subramania et al. |
| 2008/0225945 A1 | 9/2008 | Wu et al. |
| 2011/0051806 A1 * | 3/2011 | Lee ......................... 375/240.03 |

OTHER PUBLICATIONS

Office Action received for Taiwan Patent Application No. 102113795, mailed on May 27, 2015, 3 pages of English Translation and 3 pages of Taiwan Office Action.

\* cited by examiner

*Primary Examiner* — Leron Beck
(74) *Attorney, Agent, or Firm* — Forefront IP Lawgroup, PLLC

(57) ABSTRACT

Described herein are techniques related to frame-level quantization parameter (QP) adjustment in video encoding. In particular, a method of implementing a bit rate control (BRC) algorithm is described to dynamically control the QP during the video encoding.

27 Claims, 6 Drawing Sheets

| Distortion Ratio "σ" 302 | <.5 304 | .5 - .85 310 | .85 - 1.07 312 | 1.07 - 1.5 314 | >1.5 316 |
|---|---|---|---|---|---|
| QP Adjustment 306 | -- 308 | - 318 | 0 320 | + 322 | ++ 324 |

FIG. 3

FRAME LEVEL RATE CONTROL USING MOTION ESTIMATED DISTORTIONS

RELATED APPLICATION

This application claims the benefit of priority of U.S. Provisional Patent Application Ser. No. 61/637,021 filed Apr. 23, 2012.

BACKGROUND

Video coding is a process of preparing video (video data), where the video is encoded to meet proper formats and specifications for recording and playback. Motion estimation is an important and computationally intensive task in video coding and video compression.

The Video Coding Experts Group (VCEG), together with the International Organization for Standardization (ISO)/International Electrotechnical Commission (IEC) joint working group, the Moving Picture Experts Group (MPEG), has developed the Advanced Video Coding (AVC) standard. The AVC standard, or AVC, is also known as H.264. The AVC is an example of a standard for video encoding, and is one of the most commonly used formats for the recording, compression, and distribution of high definition video. Other standards include and are not limited to, Motion Pictures Experts Group 2 (MPEG2), Scalable Video Coding (SVC), and High Efficiency Video Coding (HEVC), etc.

In a typical video encoding process, a first stage is to analyze the frame to find spatial and temporal redundancy which can be exploited to reduce the bits to describe a given frame of a video. Specifically, each macro block is predicted from spatial neighbors or temporal neighbors, where the objective of the encoder is to predict the current macro block with the least amount of error, because the error correction terms represent the largest cost in bits of the final bitstream. A second stage of the typical video encoding process may require a second pass of encoding based on the first stage.

BRIEF DESCRIPTION OF THE DRAWINGS

FIG. 3 illustrates an example look-up table for dynamically adjusting a quantization parameter (QP).

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for implementing a bit rate control (BRC) algorithm to perform video compression in a single pass. In an implementation, the BRC algorithm may implement dynamic adjustment of a quantization parameter (QP) in video encoding. The QP may regulate how much spatial detail is saved. For example, when the QP is relatively small, almost all of the spatial detail is retained. As the QP increases, some of the spatial detail is aggregated so that bit rate drops—at a price of increasing distortion and loss of quality. In an implementation, the BRC algorithm is used to calculate a distortion ratio that is based upon intra (I) frame, predictive (P) frame, and/or bidirectional (B) frame encoding approaches. In this implementation, the distortion ratio includes a ratio of an adjusted average distortion over an adjusted current frame distortion. The adjusted average distortion may include historical average of I-frame, P-frame, or B-frame distortions for a given number of frames, while the adjusted current frame distortion includes a frame level distortion of current image frame, or the adjusted current frame distortion includes summation of macro block distortions that define the current image frame. In an implementation, the distortion ratio is compared to a threshold value for a particular I-frame, P-frame, or B-frame type, which includes different threshold values. If the computed distortion ratio is greater than the threshold value for the particular I-frame, P-frame, or B-frame type, then a scene change is declared. In case of scene change declaration, the BRC algorithm may reset all statistics, coefficients, historical QPs, and further sets the QP for the current frame to its initial QP value. Otherwise, if no scene change is declared, then the BRC algorithm may adjust the QP corresponding to a range of the computed distortion ratio. In an implementation, a look-up table is implemented to determine the amount of QP adjustment based on the computed distortion ratio as derived above.

Figure 1:
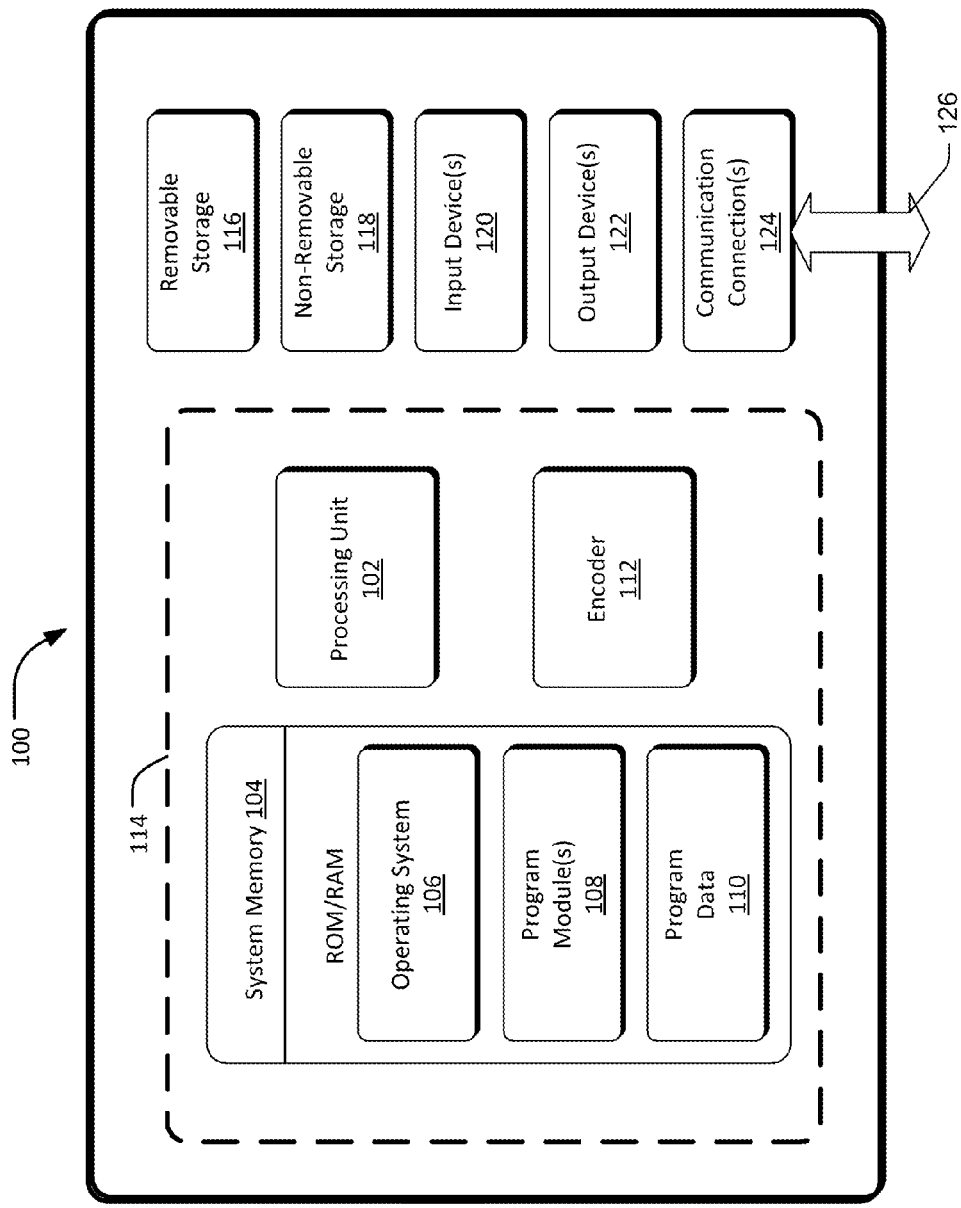
FIG. 1 illustrates an example system for implementing video encoding.

FIG. 1 shows an example system that may be utilized to implement various described embodiments. However, it will be readily appreciated that the techniques disclosed herein may be implemented in other computing devices, systems, and environments. The computing device 100 shown in FIG. 1 is one example of a computing device and is not intended to suggest any limitation as to the scope of use or functionality of the computer and network architectures.

In at least one implementation, computing device 100 includes at least one processing unit 102 and system memory 104. Depending on the exact configuration and type of computing device, system memory 104 may be volatile (such as RAM), non-volatile (such as ROM, flash memory, etc.) or some combination thereof. System memory 104 may include an operating system 106, one or more program modules 108, that in certain implementations may implement the BRC algorithm methods and techniques describe herein. System memory 104 may further include program data 110 which may include macro blocks/shapes database(s) as described later in this document. Furthermore, an encoder 112 is included in this example. The encoder 112 may be used to implement video encoding, motion estimation, motion compensation, etc. as describe herein. The encoder 112 may be operatively coupled to and communicate with processing unit 102, system memory 104, and other memory, input/output, devices, further described herein, and other components/devices not shown. A basic implementation of the computing device 100 is demarcated by a dashed line 114. For example, in certain implementations, encoder 112 may be part of an integrated graphics chip set in of central processing units (CPU) that includes 3D and media, having media functionality that includes video, specifically video decode/encode. In certain implementations, an application specific integrated circuit or ASIC may include the encoder 112 as a fixed function encoder.

It is contemplated that devices with video encoding may make use of the techniques, methods, and devices described. Examples of such devices include media players, video conferencing devices, etc.

In certain implementations, program modules 108 may include specific modules (not shown) such as a codec or software/firmware based encoder, configured to implement the video encoding techniques and methods described herein. For example, such modules in certain implementations may perform the processes of encoder 112. Example codecs include AVC, VC1, ATVC, and SVC.

Computing device 100 may have additional features or functionality. For example, computing device 100 may also include additional data storage devices such as removable storage 116 and non-removable storage 118. In certain implementations, the removable storage 116 and non-removable storage 118 are an example of computer accessible media for storing instructions that are executable by the processing unit 102 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., computing device 100. Any of such computer accessible media may be part of the computing device 100.

In one implementation, the removable storage 116, which is a computer accessible medium, has a set of instructions stored thereon. When executed by the processing unit 102, the set of instructions cause the processing unit 102 to execute operations, tasks, functions and/or methods as described herein, and any variations thereof.

Computing device 100 may also include one or more input devices 120 such as keyboard, mouse, pen, voice input device, touch input device, etc. Computing device 100 may additionally include one or more output devices 122 such as a display, speakers, printer, etc.

Computing device 100 may also include one or more communication connections 124 that allow the computing device 100 to communicate by wire or wirelessly with one or more other devices (not shown), over connection 126. It is appreciated that the illustrated computing device 100 is one example of a suitable device and is not intended to suggest any limitation as to the scope of use or functionality of the various embodiments described.

Figure 2:
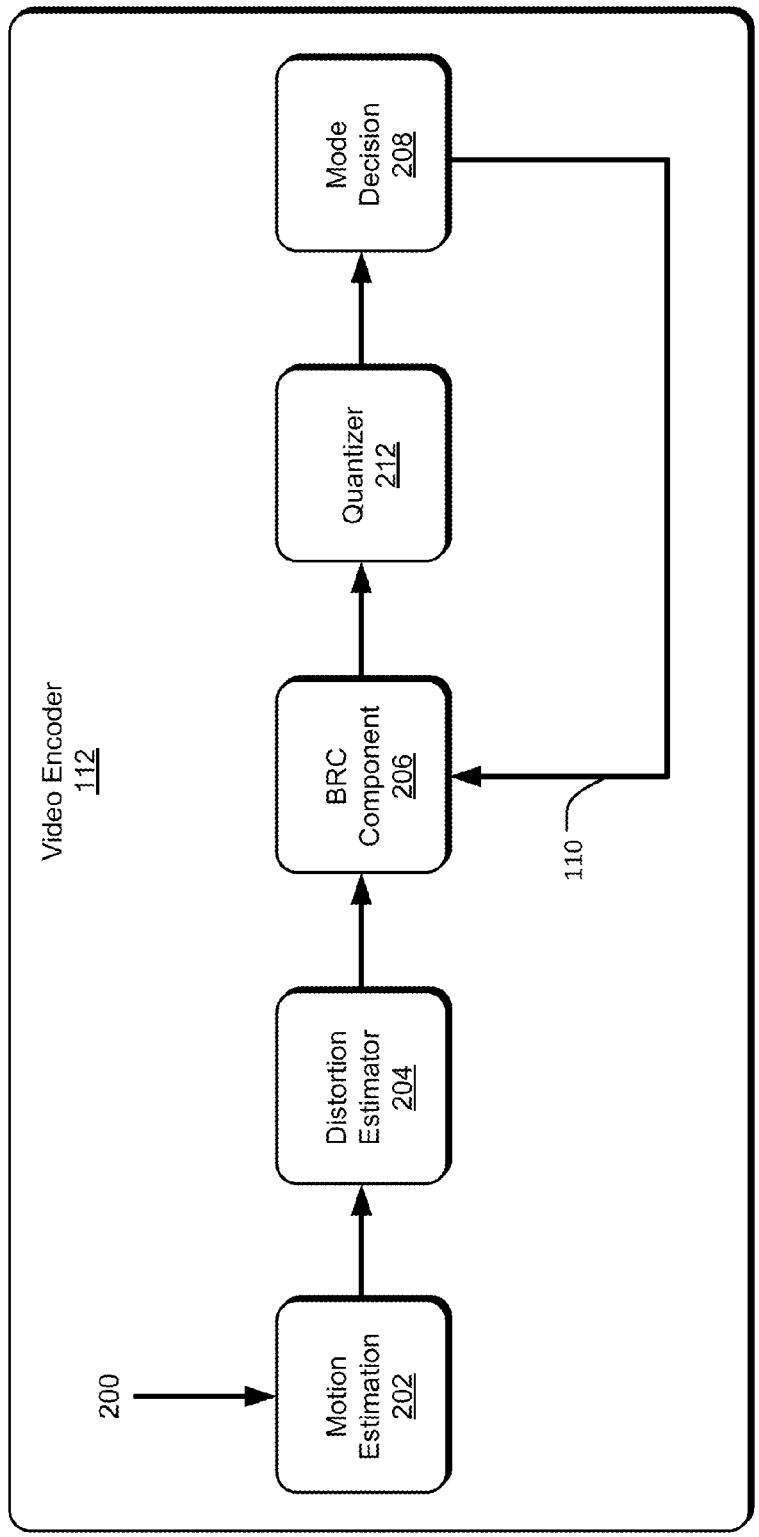
FIG. 2 illustrates an example video encoder for implementing bit-rate control (BRC) algorithm in a single passing.

FIG. 2 shows an example video encoder 112 that implements the BRC algorithm to perform a video compression in a single passing. In other words, a single pass video compression is performed by dynamically adjusting the QP to maintain quality during encoding and bit-rate transmission. In certain implementations, the video encoder 112 may be implemented as part of a central processing unit, part of integrated circuit chipset, or be a separate component/device. As discussed above, in certain implementations, the video encoder 112 may be implemented as firmware or software, such as a codec. Furthermore, FIG. 2 is merely illustrative and may contain additional blocks or components and/or different arrangement of the blocks or components.

In an implementation, the video encoder 112 may receive from video input 200 image frames that are to be encoded to generate corresponding encoded frames in the form of an encoded bit-stream, which includes series or combinations of I, P, and/or B streams. In this implementation, one or more blocks of the video encoder 112 may be configured to perform video encoding consistent with one or more standards such as, MPEG, H.264, etc. In an implementation, the received image frames from the video input 200 may be processed by a motion estimation component 202 for encoding of the received image frames into either I-frame (i.e., static frame) and/or inter-coded frames (i.e., P-frame or B-frame) encoding approaches. The I frame encoding refers to an encoding approach in which macro-blocks of the image frame are represented based on the macro-blocks of the same frame (i.e., the image frame is coded without reference to any other image frame except itself). The motion estimation component 202 may use spatial compression techniques to encode the I-frame. The spatial compression techniques may be performed consistent to the standards noted above. Accordingly, the motion estimation component 202 may operate to determine correlation between macro-blocks in the image frame to generate a compressed or uncompressed representation of the macro-block for the I-frame. Furthermore, the motion estimation component 202 may generate motion vectors representing displacement between the macro-blocks in the P-frame or the B-frame, which include reference frames in the encoding approach. The motion estimation component 202 may use previously stored image frames (not shown) as a basis for the encoding approach of the P-frame and the B-frame.

In an implementation, a distortion estimator component 204 is configured to calculate a distortion ratio "a" between an "adjusted average distortion" and "adjusted current frame distortion." The configured calculation for the distortion ratio "a" is illustrated in following formulas:

$$a = \frac{b}{c} \quad (1)$$

$$b = \frac{e}{MB} \text{POWER}\alpha \quad (2)$$

$$c = \frac{d}{MB} \text{POWER}\alpha \quad (3)$$

$$e = \frac{f1 + f2 + \dots fn}{n} \quad (4)$$

Where
 a—is the distortion ratio that is compared to a frame type threshold value (not shown);
 b—is the adjusted average distortion for I, P, or B frame type;
 c—is the adjusted current frame distortion;
 e—is a calculated historical average of the distortions (without maximum and minimum history values) for either I, P, or B-frame types;
 d—is a computed frame-level distortion or sum of macro-block level distortions for the current frame (i.e., current frame may be I, P, or B frame type);

f—is calculated distortion for each frame type (i.e., "f" may be I, or P, or B frame type);
n—is number of frames for each frame type to be averaged;
α—is a constant with a typical value of zero to one; and
MB—is number of macro-blocks in the current frame.

In an implementation, the distortion estimator component 204 is configured to calculate the distortion ratio "a" on each of the I-frame, P-frame, or B frame types. For example, the distortion ratio "a" in Eq. 1 may include coefficient or variable "b" that is based on previously stored calculated distortions for the I-frames (e.g., last five I-frames), or the variable "b" may be based on previously stored calculated distortions for the P-frames (e.g., predicted four P-frames), or the variable "b" may be based on previously stored calculated distortions for the B-frames (e.g., last four B-frames). In this example, the variable "b" may be based upon a given number of frames for the three different frame types (i.e., I, P, or B-frame types); however, the variable "c" may be based on the current frame. In an implementation, the distortion ratio "a" in Eq. 1 is compared to a threshold value "ω" that includes different range values depending upon the frame type (i.e., I, P, or B-frame) that is computed for the variable "b" as discussed above. For example, if the last five I-frames are used to calculate the variable "b," then the threshold value "ω" for the I-frame type is used for comparison reference for the distortion ratio "a."

In an implementation, the distortion estimator component 204 may be configured to calculate the adjusted average distortion value "e" in Eq. 4 using other frames that are stored in the system memory 104. For example, if last 15 frames in the system memory 104 include five separately computed I-frame distortions, five separately computed P-frame distortions, and five separately computed B-frame distortions, then the calculated average distortions "e" for each type of frame may be calculated as the sum of the separately computed distortions (i.e., I, P, or B-frame) divided by 5. In another example, if the last 15 frames in the system memory 104 include three separately computed I-frame distortions, six separately computed P-frame distortions, and six separately computed B-frame distortions, then the calculated average distortions "e" for the I, P, or B type of frame may be calculated as the sum of the separately computed distortions for each type (i.e., I, P, or B-frame) divided by 3, 6 and 6, respectively. In other implementations where historical adjusted distortion values are not available, the following approach may be used to compute "e" in Eq. 4:

For I frames: Use empirically defined threshold that may be estimated for codec individually (e.g., one threshold for MPEG2, another for AVC, etc.);
For P frames: The estimated historical distortion is equal to previous I frame distortion multiplied by a coefficient. The coefficient depends on codec e.g., coefficient=0.75;
For B frames: The estimated historical distortion is equal to previous P frame distortion multiplied by the coefficient. The coefficient depends on the codec e.g., coefficient=0.75.

In an implementation, the distortion estimator component 204 may calculate the adjusted current frame distortion "c" using the frame-level calculation, or using the macro-block level calculation. In the frame-level calculation, the variable "d" in Eq. 3 may include the actual computed distortion on the current frame that is taken as a whole or as a single macro-block. The whole or single macro-block may use itself as a reference to perform the frame-level calculation. In the macro-block level calculation, the same variable "d" in Eq. 3 may include sum of distortions that are computed on individual macro-blocks that define the current frame. The sum of distortions may similarly use the same current frame to obtain the macro block level calculation for the variable "d." In an implementation, the current frame may include a reduced resolution during the calculation of the variable "d" in Eq. 3. Furthermore, the reduced resolution may be similarly applied when calculating the distortion ratio "a" in Eq. 1.

In an implementation, a BRC component 206 may use the calculated distortion ratio "a" for the dynamic adjustment of the QP. In this implementation, the calculated distortion ratio "a" is compared to the threshold value "ω" to determine if a scene change has occurred. For example, if the calculated distortion ratio "a" is greater than the configured threshold value "ω," then the scene change is declared. In case of scene change, the BRC component 206 may reset all statistics, such as coefficients "a," "b," "c," historical QPs, etc., and further sets the QP for the current frame equal to its initial QP value. If there is no scene change declared, then a detected rate control may adjust the current frame QP depending upon a range of the calculated distortion ratio "a" as further discussed below. The detected rate control may be implemented by the BRC algorithm to adjust the QP for the current frame type using the actual value of the calculated distortion ratio "a."

In an implementation, the BRC component 206 may receive "current" transmission bit-rate from mode decision component 208 through a feedback loop 210, and operates to determine the QP to be used for quantizing macro-blocks of the current frame. In this implementation, the "current" transmission bit-rate may include current mode such as, whether the I, P, or B-frame type is currently deployed for encoding and transmission by the mode decision component 208. For example, the "current" transmission bit-rate may define final or present QP value that is used for the current frame type (e.g., I-frame) at the mode decision component 208. In this example, in case of scene change declaration, the present QP value may be reset to include an initial value that is used to quantize the macro-blocks of the current I-frame. However, if no scene change is declared, then the value of the QP that is supplied by the feedback loop 210 may be increased or decreased depending upon the derived calculated distortion ratio "a" in Eq. 1. Furthermore, the feedback loop 210 may supply the stored frames (not shown) in the system memory 104 for calculating the distortion ratio "a" in Eq. 1 for the current frame. In an implementation, the BRC component 206 may utilize the distortion ratio "a" in Eq. 1 to better estimate size of the current frame.

In an implementation, a quantizer component 212 is controlled by the BRC component 206 for encoding the video frames 200 in a single passing. The quantizer component 212 may include a dynamically adjustable QP that is used as a key parameter for controlling amount of information to be kept or thrown out during the encoding approach. For example, the higher the QP, the lesser the information is retained, and as such, the quality of the encoding approach is decreased. Similarly, the lower the QP, the higher the information we keep, and as such, the quality of the encoding approach is increased. In an implementation, where scene change is not declared, the look-up table as discussed in FIG. 3 is used for proper configuration of the dynamically adjustable QP in the quantizer component 212. In another implementation where scene change is declared, then the QP of the quantizer component 212 is reset to its initial value.

FIG. 3 illustrates an example look-up table 300 for the dynamic adjustment of the QP depending upon actual value of the calculated distortion ratio "a" in Eq. 1. In an implementation, the look-up table 300 may be utilized by the BRC algorithm where no scene change is declared. In other words, the calculated distortion ratio "a" for the specific frame type (i.e., I, P, or B-frame) is lesser than the threshold value "ω" for the specific frame type. In an implementation, the BRC component 206 may dynamically adjust the QP of the quantizer component 212 depending upon the range of the calculated distortion ratio "a." For example, if the calculated distortion ratio "a" 302 includes a value that is lesser than 0.5 (i.e., "<0.5" 304), then a corresponding QP adjustment 306 may be made to include a minimum QP (i.e., "−−" 308). In this example, the BRC algorithm may be configured to significantly decrease the current value of the QP that may be derived from the "current" transmission bit-rate in the feedback loop 110. In another example, where the calculated distortion ratio "a" 302 includes a value that is higher than 0.85 but lesser than 1.07 (i.e., "0.85-1.07" 304), then a corresponding QP adjustment 306 may be made to include a zero QP (i.e., "0" 320). In other words, the present value of the QP that may be derived from the "current" transmission bit-rate in the feedback loop 110 is maintained. In other examples, for different values of calculated distortion ratio "a" 302 such as shown in blocks 310, 314 and 316, the QP adjustment 306 may include QP adjustments that are shown in blocks 318, 322, and 324, respectively.

Figure 4:
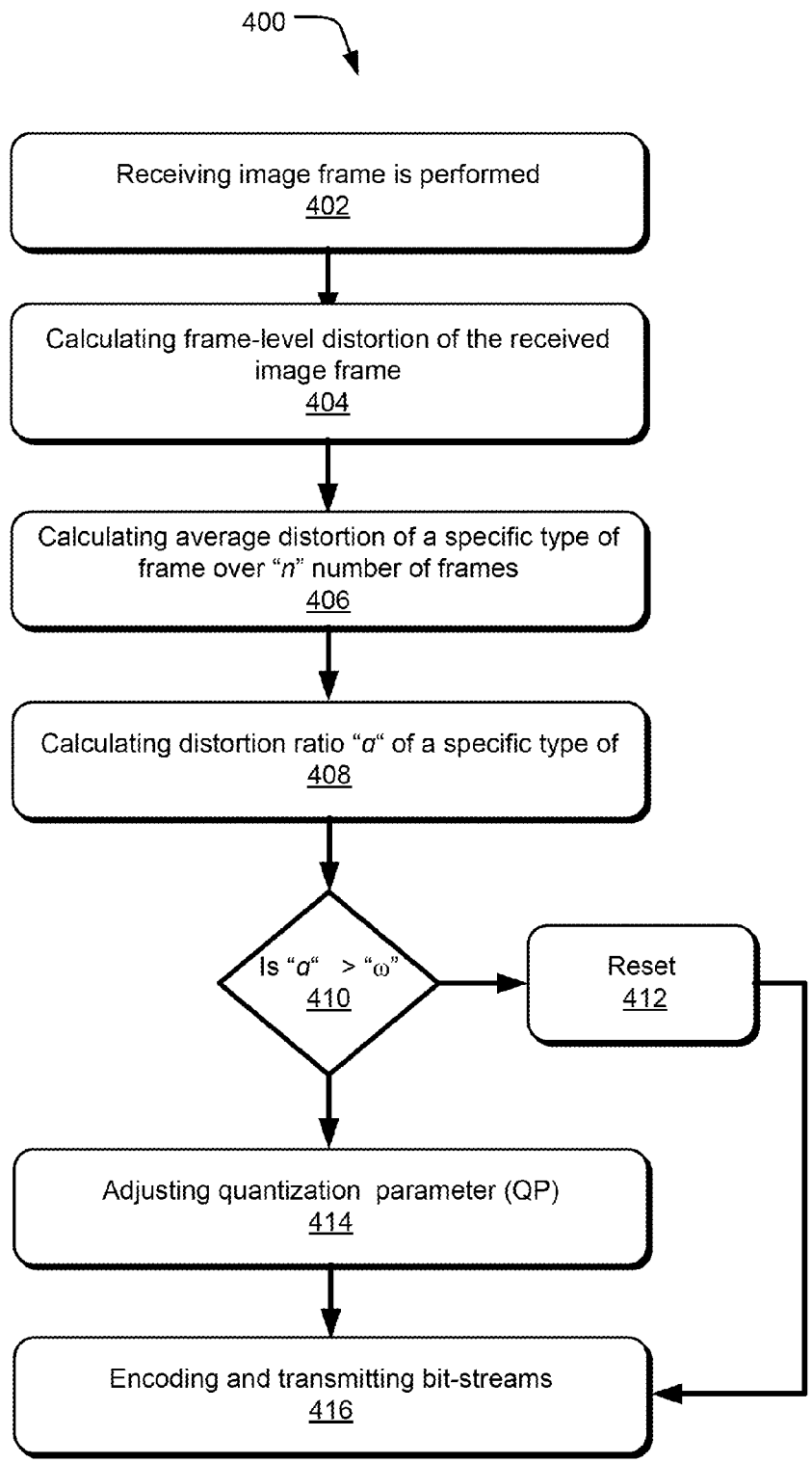
FIG. 4 illustrates an example method for implementing a bit-rate control (BRC) algorithm in video encoding

FIG. 4 shows an example process flowchart 400 illustrating an example method for implementing the BRC algorithm to perform a video compression in a single passing. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, receiving image frame is performed. In an implementation, the image frame may be received from a video input or source (e.g., video input 200) of a video encoder (e.g., video encoder 112) for encoding to generate corresponding encoded frames in the form of an encoded bit-stream. In an implementation, the received image frames from the video input 200 may be processed by a motion estimation component (e.g., motion estimation component 202) for encoding of the received image frames into either I-frame and/or inter-coded frames such as, P-frame or B-frame.

At block 404, calculating frame-level distortion of the image frame is performed. In an implementation, a distortion estimation component (e.g., distortion estimation component 204) may calculate an adjusted current frame distortion (e.g., "c" in Eq. 1) of the received image frame using a frame-level distortion calculation. In the frame-level distortion calculation, the calculation may be based upon an actual computed distortion on the current frame that is taken as a whole or as a single macro-block, and without reference to any other frame but itself or themselves. In other words, the received image frame is treated as a single frame for purposes of computing the adjusted current frame distortion "c" in Eq. 1. In other implementations, the distortion estimation component 204 may use macro-block level calculation to compute the adjusted current frame distortion "c." For example, the received image frame may include summation of macro-block distortions that define the frame-level distortion requirements in calculating the adjusted current frame distortion "c." In an implementation, the frame-level distortion for the variable "c" may include disparity between the received frame and itself as the reference.

At block 406, calculating average distortion is performed. In an implementation, the distortion estimation component 204 may be configured to calculate the average distortion (e.g., variable "b" in Eq. 2) for each type of frame (i.e., I, P, or B frames). For example, the average distortion "b" for the I-frame type may include summation of previously calculated "n" I-frame distortions (e.g., f1 is I-frame 1, f2 is I-frame 2, . . . fn is I-frame n) divided by "n."

At block 408, calculating distortion ratio is performed. In an implementation, the distortion estimation component 204 may be configured to calculate the distortion ratio (e.g., variable "a" in Eq. 1). The distortion ratio "a" may include a ratio of the average distortion "b" over the adjusted current frame distortion "c." In an implementation, the distortion estimation component 204 may compute the distortion ratio "a" for a particular frame-type that is to be quantized for bit-rate transmission at a mode decision block (e.g., mode decision component 208). For example, under the H.264 standard, the mode decision component 208 may successively transmit a single I-frame, two P-frames, and one B-frame, which represent a macro-block. In this example, the distortion estimation component 204 may compute different distortion ratio "a" separately for the single I-frame, two P-frames, and the one B-frame. In an implementation, the adjustment of the QP is based upon a threshold value (e.g., threshold value "ω" that includes different values for different frame types).

At block 410, determining if the distortion ratio "a" is greater than the threshold value "ω" is performed. In an implementation, a BRC component (e.g., BRC component 206) may be configured to compare the computed distortion ratio "a" for a particular frame type to the threshold value "ω" for the particular frame type. For example, if the computed distortion ratio "a" is greater than the threshold value "ω," then at block 412, the current value of the QP and other variables/coefficients are reset to its initial value. The initial value may include a configuration parameter of the video encoder 112 for normal processing of the different frame types. On the other hand, if the distortion ratio "a" is lesser than the threshold value "ω," then at block 414, a current value of the QP for the particular frame type is adjusted based on a look-up table (e.g., look-up table 300). In an implementation, the current value of the QP may be maintained, increased, or decreased based on the calculated distortion ratio.

At block 416, encoding and transmitting bit-streams is performed. In an implementation, a mode decision component (e.g., mode decision component 208) may determine series and/or combination of the I-frame, P-frame, or B-frame encoding approaches that may be used for encoding and transmitting the bit-streams that include the I, P, and/or B frame types. The series and/or combination of the I-frame, P-frame, or B-frame encoding approaches may utilize the QP supplied by the reset 412 or the adjusting QP 414. In an implementation, a final value of the QP is fed back or stored for processing by the adjusting QP 414 in case no scene change is declared. For example, if no scene change is declared in a next image frame received at block 402, then the final value of the QP is made as a reference at the adjusting QP block 414.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

Figure 5:
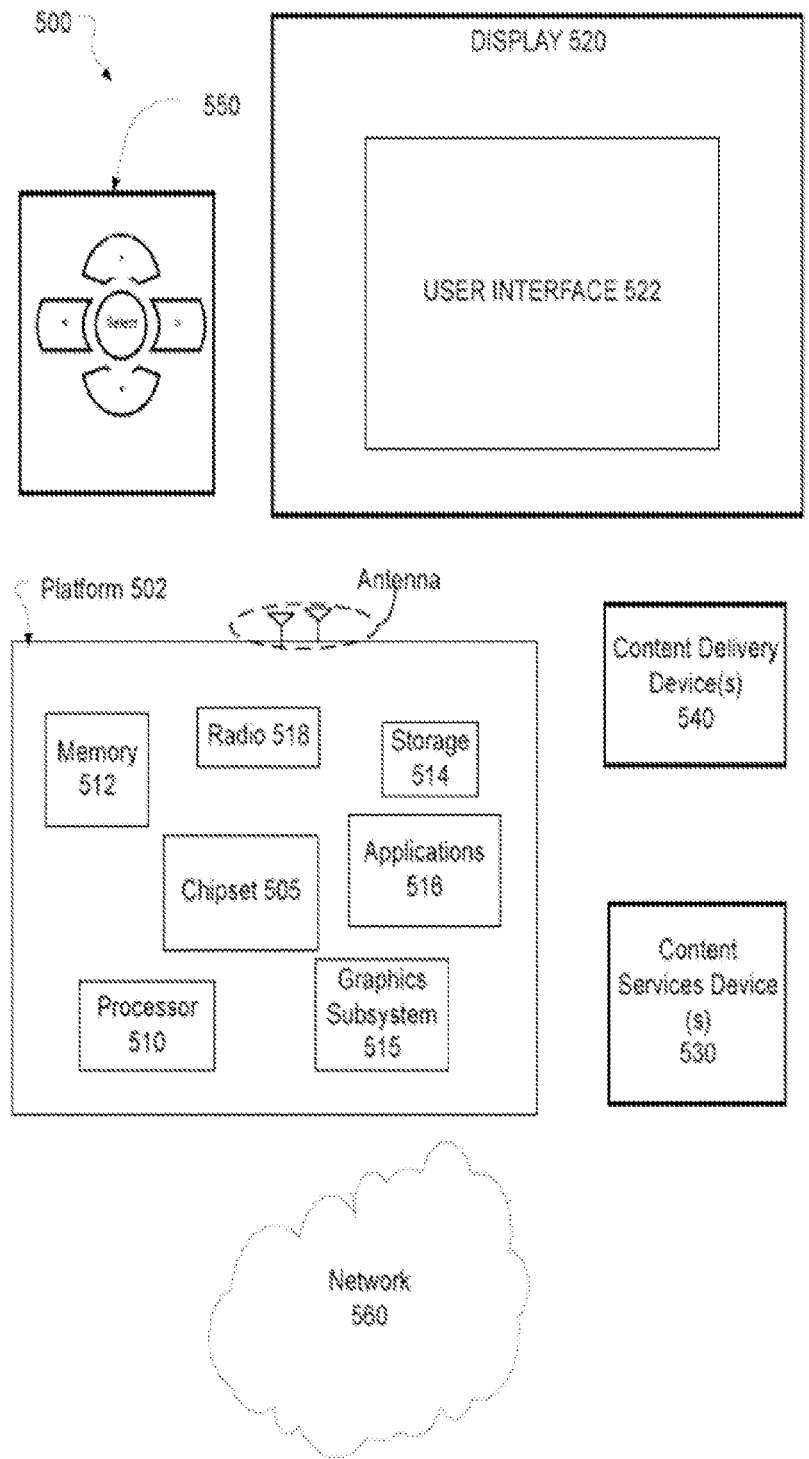
FIG. 5 is an illustrative diagram of an example system.

FIG. 5 illustrates another example system 500 in accordance with the present disclosure. In various implementations, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 500 includes a platform 502 coupled to a display 520. Platform 502 may receive content from a content device such as content services device(s) 530 or content delivery device(s) 540 or other similar content sources. A navigation controller 550 including one or more navigation features may be used to interact with, for example, platform 502 and/or display 520. Each of these components is described in greater detail below.

In various implementations, platform 502 may include any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 510 may be dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 514 may include technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 may be integrated into processor 510 or chipset 505. In some implementations, graphics subsystem 515 may be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, display 520 may include any television type monitor or display. Display 520 may include, for example, a computer display screen, touch screen display, video monitor, television-like device, and/or a television. Display 520 may be digital and/or analog. In various implementations, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In various implementations, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In various implementations, content services device(s) 530 may include a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but may be integrated into platform 502 and/or display 520. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 even when the platform is turned "off." In addition, chipset 505 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
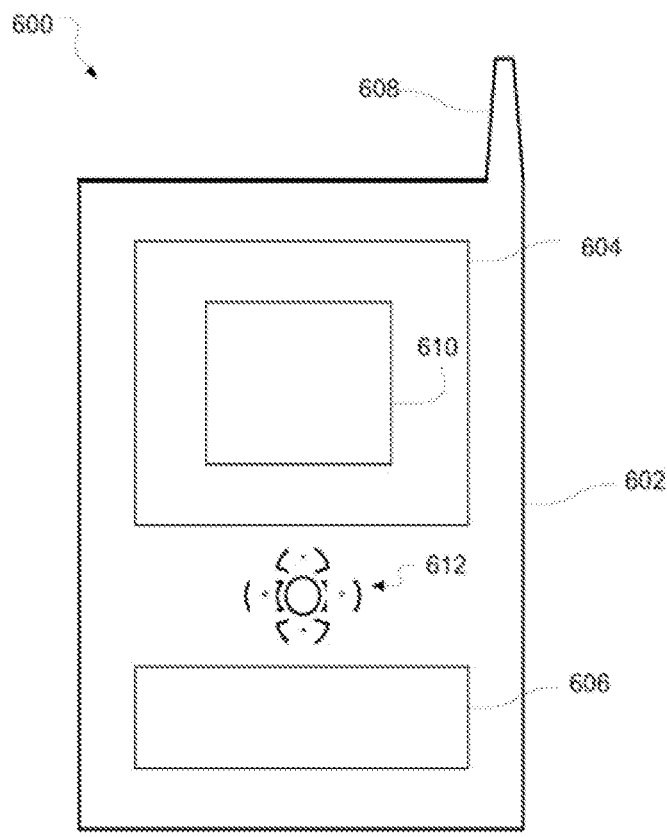
FIG. 6 is an illustrative diagram of an example device, all arranged in accordance with at least some implementations of present disclosure.

As described above, system 500 may be embodied in varying physical styles or form factors. FIG. 6 illustrates implementations of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a housing 602, a display 604, an input/output (I/O) device 606, and an antenna 608. Device 600 also may include navigation features 612. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The following examples pertain to further embodiments. A device comprising: one or more processors; memory configured to the processors; a video encoder configured to the processors and memory comprising: a video input to supply an image frame; a motion estimator component to received the image frame for encoding that includes intra (I) frame, a predictive (P) frame, and/or a bidirectional (B) frame encoding approaches; a distortion estimator component to calculate a distortion ratio based on the I-frame, the P-frame, and/or the B-frame encoding approaches; a bit-rate control (BRC) component to dynamically adjust quantization parameter (QP) based on the distortion ratio; and a mode decision component to generate encoded bit-streams representing the I-frame, the P-frame, and/or the B-frame encoding approaches, wherein the encoded bit-streams are transmitted using the dynamically adjusted QP.

In certain implementations, a device wherein the video encoder performs encoding in a single passing.

In certain implementations, a device wherein the distortion ratio includes a ratio of an adjusted average distortion over an adjusted current frame, wherein the adjusted average distortion includes historical average of I-frame, P-frame, or B-frame distortions for a given number of frames, wherein the adjusted current frame includes a frame level distortion of current image frame or summation of macro block distortions that define the current image frame.

In certain implementations, a device wherein the distortion ratio includes a ratio of an adjusted average distortion over an adjusted current frame, wherein the adjusted average distortion includes empirically defined threshold for the I frame; and estimated historical distortions for the P and B frames.

In certain implementations, a device wherein the distortion ratio is compared to a threshold value for the dynamic adjustment of the QP, wherein the comparison is separately performed for different I-frame, P-frame, or B-frame types, which include different threshold values.

In certain implementations, a device wherein the calculation of the distortion ratio is based on a reduced resolution.

In certain implementations, a device wherein a final value of the QP at the mode decision component is fed back to the BRC component for the dynamic adjustment of the QP in a next image frame.

In certain implementations, a device wherein the BRC component declares a scene change if the distortion ratio is greater than a threshold value for a particular I-frame, P-frame, or B-frame type, wherein the QP is reset to an initial value in case of scene change declaration.

In certain implementations, a device wherein the BRC component declares no scene change if the distortion ratio is lesser than a threshold value for a particular I-frame, P-frame, or B-frame type, wherein value of the QP is maintained, decreased, or increased corresponding to amount of the calculated distortion ratio.

In certain implementations, a device wherein the BRC component includes a look-up table for the dynamic adjustment of the QP if the distortion ratio is lesser than a threshold value for a particular I-frame, P-frame, or B-frame type.

A video encoder that implements a bit-rate control (BRC) algorithm comprising: a video input to supply an image frame; a motion estimator component to received and process the image frame for encoding; a distortion estimator component to calculate a distortion ratio based on adjusted average distortion of an intra (I) frame, predictive (P) frame, or bidirectional (B) frame distortions, and a frame-level distortion for the image frame; a BRC component to dynamically adjust a quantization parameter (QP) based on the distortion ratio; and a mode decision component to generate encoded bit-streams based on the dynamically adjusted QP.

In certain implementations, the video encoder wherein the motion estimator component determines correlation between macro-blocks of the image frame to generate a representation of the macro-block for an I frame encoding approach, wherein the motion estimator component generates motion vectors representing displacement between the macro-blocks in inter-frame encoding approaches.

In certain implementations, the video encoder wherein the adjusted average distortion includes historical average of the I frame, P frame, or B frame distortions for a given number of frames, wherein the frame level distortion of the image frame includes summation of macro block distortions that define the current image frame.

In certain implementations, the video encoder wherein the distortion ratio is compared to a threshold value for the dynamic adjustment of the QP, wherein the comparison is separately performed for different I-frame, P-frame, or B-frame types, which include different threshold values.

In certain implementations, the video encoder wherein the frame-level distortion is based on a reduced resolution of the image frame.

In certain implementations, the video encoder wherein a final value of the QP that is used by the mode decision component is fed back to the BRC component as a reference QP during dynamic adjustment of the QP in a next image frame.

In certain implementations, the video encoder wherein the BRC component declares a scene change if the distortion ratio is greater than a threshold value for a particular I-frame, P-frame, or B-frame type, wherein at least the QP is reset to an initial value in case of scene change declaration.

In certain implementations, the video encoder wherein the BRC component declares no scene change if the distortion ratio is lesser than a threshold value for a particular I-frame, P-frame, or B-frame type, wherein a reference value of the QP is maintained, decreased, or increased corresponding to amount of the calculated distortion ratio.

In certain implementations, the video encoder wherein the BRC component includes a look-up table for the dynamic adjustment of the QP if the distortion ratio is lesser than a threshold value for a particular I-frame, P-frame, or B-frame type.

In certain implementations, the video encoder wherein the mode decision component generates the encoded bit-streams in a single passing.

A method of implementing a bit-rate control (BRC) algorithm in video encoding comprising: receiving an image frame; calculating frame level distortion of the image frame; calculating average distortion for (intra) I frame type, predictive (P) frame type, or bidirectional (B) frame type; calculating a distortion ratio based on the calculated frame level distortion and the calculated average distortion; comparing the distortion ratio to a configured threshold value that includes separate and different threshold values for the I frame, P frame, or B frame types; adjusting a quantization parameter (QP) based on the distortion ratio.

In certain implementations, a method wherein the calculating frame level distortion includes summation of calculated macro block distortions that define current image frame.

In certain implementations, a method wherein the calculating frame level distortion includes the same image frame that is used as a reference frame.

In certain implementations, a method wherein the calculating average distortion includes historical average of I-frame, P-frame, or B-frame distortions for a given number of frames.

In certain implementations, a method wherein the calculating a distortion ratio is based on a reduced resolution of the received image frame.

In certain implementations, a method wherein comparing the distortion ratio includes declaration of a no scene change if the distortion ratio is lesser than the configured threshold value for a particular I-frame, P-frame, or B-frame type, wherein value of the QP is maintained, decreased, or increased corresponding to amount of the calculated distortion ratio.

In certain implementations, a method wherein comparing the distortion ratio includes a scene change declaration if the distortion ratio is greater than the configured threshold value for a particular I-frame, P-frame, or B-frame type, wherein the QP is reset to an initial value in case of scene change declaration.

In certain implementations, a method wherein the adjusting a QP includes utilization of a look-up table for dynamic adjustment of the QP if the distortion ratio is lesser than the configured threshold value for a particular I-frame, P-frame, or B-frame type.

In certain implementations, a method wherein adjusting a QP includes adjusting a final value of the QP on previous I-frame, P-frame, or B-frame type if the distortion ratio is lesser than the configured threshold value.

In certain implementations, a method further comprising encoding and transmitting bit streams in a single passing, wherein the bit-streams represent series and/or combination of I-frame, P-frame, or B-frame encoding approaches.

What is claimed is:
1. A device comprising:
one or more processors;
memory configured to the processors;
a video encoder configured to the processors and memory comprising
a video input to supply an image frame;
a motion estimator component to receive the image frame for encoding that includes intra (I) frame, a predictive (P) frame, and a bidirectional (B) frame encoding approaches;
a distortion estimator component to calculate a distortion ratio based on the I-frame, the P-frame, and the B-frame encoding approaches, wherein the distortion ratio includes a ratio of an adjusted average distortion over an adjusted current frame, wherein the adjusted average distortion includes historical average of I-frame, P-frame, or B-frame distortions for a given number of frames, wherein the adjusted current frame includes a frame level distortion of current image frame or summation of macro block distortions that define the adjusted current image frame, wherein the image frame is encoded without reference to any other image frame except the image frame;

a bit-rate control (BRC) component to dynamically adjust quantization parameter (QP) based on the distortion ratio; and a mode decision component to generate encoded bit-streams representing the I-frame, the P-frame, and the B-frame encoding approaches, wherein the encoded bit-streams are transmitted using the dynamically adjusted QP.

2. The device of claim 1 wherein the video encoder performs encoding in a single pass.

3. The device of claim 1 or 2 wherein the distortion ratio includes a ratio of an adjusted average distortion over an adjusted current frame, wherein the adjusted average distortion includes empirically defined threshold for the I frame; and estimated historical distortions for the P and B frames.

4. The device of claim 1 or 2 wherein the distortion ratio is compared to a threshold value for the dynamic adjustment of the QP, wherein the comparison is separately performed for different I-frame, P-frame, or B-frame types, which include different threshold values.

5. The device of claim 1 or 2 wherein the calculation of the distortion ratio is based on a reduced resolution.

6. The device of claim 1 or 2 wherein a final value of the QP at the mode decision component is fed back to the BRC component for the dynamic adjustment of the QP in a next image frame.

7. The device of claim 1 or 2 wherein the BRC component declares a scene change if the distortion ratio is greater than a threshold value for a particular I-frame, P-frame, or B-frame type, wherein the QP is reset to an initial value in case of scene change declaration.

8. The device of claim 1 or 2 wherein the BRC component declares no scene change if the distortion ratio is lesser than a threshold value for a particular I-frame, P-frame, or B-frame type, wherein value of the QP is maintained, decreased, or increased corresponding to amount of the calculated distortion ratio.

9. The device of claim 1 or 2 wherein the BRC component includes a look-up table for the dynamic adjustment of the QP if the distortion ratio is lesser than a threshold value for a particular I-frame, P-frame, or B-frame type.

10. A video encoder that implements a bit-rate control (BRC) algorithm comprising:

a video input to supply an image frame;

a motion estimator component to received and process the image frame for encoding;

a distortion estimator component to calculate a distortion ratio based on adjusted average distortion of an intra (I) frame, predictive (P) frame, or bidirectional (B) frame distortions, and a frame-level distortion for the image frame, wherein the distortion ratio includes a ratio of an adjusted average distortion over an adjusted current frame, wherein the adjusted average distortion includes historical average of I-frame, P-frame, or B-frame distortions for a given number of frames, wherein the adjusted current frame includes a frame level distortion of current image frame or summation of macro block distortions that define the adjusted current image frame, wherein the image frame is encoded without reference to any other image frame except the image frame;

a BRC component to dynamically adjust a quantization parameter (QP) based on the distortion ratio; and a mode decision component to generate encoded bit-streams based on the dynamically adjusted QP.

11. The video encoder of claim 10 wherein the motion estimator component determines correlation between macro-blocks of the image frame to generate a representation of the macro-block for an I frame encoding approach, wherein the motion estimator component generates motion vectors representing displacement between the macro-blocks in inter-frame encoding approaches.

12. The video encoder of claim 10 or 11 wherein the distortion ratio is compared to a threshold value for the dynamic adjustment of the QP, wherein the comparison is separately performed for different I-frame, P-frame, or B-frame types, which include different threshold values.

13. The video encoder of claim 10 or 11 wherein the frame-level distortion is based on a reduced resolution of the image frame.

14. The video encoder of claim 10 or 11 wherein a final value of the QP that is used by the mode decision component is fed back to the BRC component as a reference QP during dynamic adjustment of the QP in a next image frame.

15. The video encoder of claim 10 or 11 wherein the BRC component declares a scene change if the distortion ratio is greater than a threshold value for a particular I-frame, P-frame, or B-frame type, wherein at least the QP is reset to an initial value in case of scene change declaration.

16. The video encoder of claim 10 or 11 wherein the BRC component declares no scene change if the distortion ratio is lesser than a threshold value for a particular I-frame, P-frame, or B-frame type, wherein a reference value of the QP is maintained, decreased, or increased corresponding to amount of the calculated distortion ratio.

17. The video encoder of claim 10 or 11 wherein the BRC component includes a look-up table for the dynamic adjustment of the QP if the distortion ratio is lesser than a threshold value for a particular I-frame, P-frame, or B-frame type.

18. The video encoder of claim 10 or 11 wherein the mode decision component generates the encoded bit-streams in a single passing.

19. A method of implementing a bit-rate control (BRC) algorithm in video encoding comprising:

receiving an image frame;

calculating frame level distortion of the image frame;

calculating average distortion for intra (I) frame type, predictive (P) frame type, or bidirectional (B) frame type;

calculating a distortion ratio based on the calculated frame level distortion and the calculated average distortion, wherein the distortion ratio includes a ratio of an adjusted average distortion over an adjusted current frame, wherein the adjusted average distortion includes historical average of I-frame, P-frame, or B-frame distortions for a given number of frames, wherein the adjusted current frame includes a frame level distortion of adjusted current image frame or summation of macro block distortions that define the image frame, wherein the image frame is encoded without reference to any other image frame except the image frame;

comparing the distortion ratio to a configured threshold value that includes separate and different threshold values for the I frame, P frame, or B frame types;

adjusting a quantization parameter (QP) based on the distortion ratio.

20. The method of any of claim 19, wherein the calculating frame level distortion includes the same image frame that is used as a reference frame.

21. The method of any of claim 19, wherein the calculating average distortion includes historical average of I-frame, P-frame, or B-frame distortions for a given number of frames.

22. The method of any of claim 19, wherein the calculating a distortion ratio is based on a reduced resolution of the received image frame.

23. The method of any of claim 19, wherein comparing the distortion ratio includes declaration of a no scene change if the distortion ratio is lesser than the configured threshold value for a particular I-frame, P-frame, or B-frame type, wherein value of the QP is maintained, decreased, or increased corresponding to amount of the calculated distortion ratio.

24. The method of any of claim 19, wherein comparing the distortion ratio includes a scene change declaration if the distortion ratio is greater than the configured threshold value for a particular I-frame, P-frame, or B-frame type, wherein the QP is reset to an initial value in case of scene change declaration.

25. The method of any of claim 19, wherein the adjusting a QP includes utilization of a look-up table for dynamic adjustment of the QP if the distortion ratio is lesser than the configured threshold value for a particular I-frame, P-frame, or B-frame type.

26. The method of any of claim 19, wherein the adjusting a QP includes adjusting a final value of the QP on previous I-frame, P-frame, or B-frame type if the distortion ratio is lesser than the configured threshold value.

27. The method of any of claim 19, further comprising encoding and transmitting bit streams in a single passing, wherein the bit-streams represent series and combination of I-frame, P-frame, or B-frame encoding approaches.

* * * * *